US009037306B2

(12) United States Patent
Bhageria et al.

(10) Patent No.: US 9,037,306 B2
(45) Date of Patent: May 19, 2015

(54) MONITORING AND OPTIMIZING AN ELECTRICAL GRID STATE

(75) Inventors: Gopal K. Bhageria, Overland Park, KS (US); Sri Ramanathan, Lutz, FL (US); Jean-Gael F. Reboul, Kenmore, WA (US); Matthew B. Trevathan, Kennesaw, GA (US)

(73) Assignee: International Business Machines Corporation, Armonk, NY (US)

( * ) Notice: Subject to any disclaimer, the term of this patent is extended or adjusted under 35 U.S.C. 154(b) by 617 days.

(21) Appl. No.: 13/293,906

(22) Filed: Nov. 10, 2011

(65) Prior Publication Data
US 2013/0120105 A1  May 16, 2013

(51) Int. Cl.
*H02J 13/00* (2006.01)
*G05B 23/02* (2006.01)

(52) U.S. Cl.
CPC ......... *H02J 13/0079* (2013.01); *G05B 23/0264* (2013.01); *Y02B 70/3266* (2013.01); *Y04S 10/30* (2013.01); *Y04S 20/242* (2013.01); *Y02E 60/74* (2013.01)

(58) Field of Classification Search
None
See application file for complete search history.

(56) References Cited

U.S. PATENT DOCUMENTS

| | | | |
|---|---|---|---|
| 6,429,546 B1 | 8/2002 | Ropp et al. | |
| 6,801,442 B2 | 10/2004 | Suzui et al. | |
| 7,236,856 B2 | 6/2007 | Abe et al. | |
| 7,630,863 B2 | 12/2009 | Zweigle et al. | |
| 7,711,810 B2 | 5/2010 | McKinnon et al. | |
| 7,745,956 B2 | 6/2010 | Ito et al. | |
| 2004/0093177 A1 | 5/2004 | Schweitzer et al. | |
| 2006/0224336 A1 | 10/2006 | Petras et al. | |
| 2006/0259255 A1 | 11/2006 | Anderson et al. | |
| 2008/0071482 A1 | 3/2008 | Zweigle et al. | |
| 2008/0162637 A1 | 7/2008 | Adamczyk et al. | |
| 2008/0179966 A1 | 7/2008 | Horio et al. | |
| 2009/0240382 A1* | 9/2009 | Mitani et al. | 700/298 |
| 2009/0281673 A1 | 11/2009 | Taft | |
| 2009/0281674 A1 | 11/2009 | Taft | |
| 2009/0307233 A1 | 12/2009 | Zhang et al. | |
| 2010/0060259 A1 | 3/2010 | Vaswani et al. | |
| 2010/0152910 A1* | 6/2010 | Taft | 700/286 |
| 2010/0292857 A1 | 11/2010 | Bose et al. | |
| 2011/0010016 A1 | 1/2011 | Giroti | |
| 2011/0093127 A1 | 4/2011 | Kaplan | |
| 2011/0208366 A1 | 8/2011 | Taft | |
| 2011/0276192 A1 | 11/2011 | Ropp | |
| 2011/0288692 A1 | 11/2011 | Scott | |
| 2011/0307109 A1 | 12/2011 | Sri-Jayantha | |
| 2012/0063039 A1* | 3/2012 | Shah et al. | 361/20 |

(Continued)

OTHER PUBLICATIONS

International Search Report and Written Opinion dated Jan. 2, 2013 in Application No. PCT/US12/59327.

(Continued)

*Primary Examiner* — Ryan Jarrett
(74) *Attorney, Agent, or Firm* — Matthew Chung; Roberts Mlotkowski Safran & Cole, P.C.

(57) ABSTRACT

Monitoring and optimizing a state of an electrical grid are provided. An approach for synchronizing state information associated with one or more electrical devices on an electrical grid, with time information is described. The approach further includes notifying one or more subscribing devices of the synchronized state information such that the one or more subscribing devices monitors and controls the one or more electrical devices based on the synchronized state information.

25 Claims, 6 Drawing Sheets

(56) References Cited

U.S. PATENT DOCUMENTS

| | | | |
|---|---|---|---|
| 2012/0065803 A1 | 3/2012 | Teichmann et al. | |
| 2012/0082159 A1* | 4/2012 | Taft et al. | 370/390 |
| 2012/0123602 A1* | 5/2012 | Sun et al. | 700/292 |
| 2012/0173252 A1 | 7/2012 | Mak et al. | |
| 2012/0179301 A1* | 7/2012 | Aivaliotis et al. | 700/286 |
| 2013/0031201 A1 | 1/2013 | Kagan et al. | |
| 2013/0054758 A1 | 2/2013 | Imes et al. | |
| 2013/0120105 A1 | 5/2013 | Bhageria et al. | |
| 2013/0124001 A1* | 5/2013 | Bhageria et al. | 700/296 |

OTHER PUBLICATIONS

Johnston et al., "Distributing Time-Synchronous Phasor Measurement Data Using the GridStat Communication Infrastructure", IEEE, Proceedings of the 39th Hawaii International Conference on System Sciences, 2006, pp. 1-8.

Avila-Rosales et al., "Recent Experience with a Hybrid SCADA/PMU Online State Estimator", IEEE, 2009, pp. 1-8.

Klump et al., "Visualizing Real-Time Security Threats Using Hybrid SCADA/PMU Measurement Displays", IEEE, Proceedings of the 39th Hawaii International Conference on System Sciences, 2005, pp. 1-9.

D'Antonio et al., "Security Issues of a Phasor Data Concentrator for Smart Grid Infrastructure", EWDC, May 11-12, 2011, pp. 3-8, Pisa, Italy.

Roskos et al., "Phasor Measurement Units—From Exotic to Everyday", Electric Energy Online, http://www.electricenergyonline.com/?page=show_article&mag=55&article=397, 2011, 6 pages.

Naduvathuparambil et al., "Communication Delays in Wide Area Measurement Systems", IEEE, 2002, 5 pages.

International Search Report and Written Opinion dated Feb. 1, 2013 in Application No. PCT/US12/63501, 7 pages.

Office Action dated Apr. 10, 2014 for U.S. Appl. No. 13/293,918; 30 pages.

Final Office Action dated Oct. 16, 2014 in U.S. Appl. No. 13/293,918; 27 pages.

Notice of Allowance dated Jan. 22, 2015 in U.S. Appl. No. 13/293,918; 5 pages.

* cited by examiner

MONITORING AND OPTIMIZING AN ELECTRICAL GRID STATE

TECHNICAL FIELD

The present invention generally relates to electrical grids, and more particularly, to a system and a method for monitoring and optimizing a state of an electrical grid.

BACKGROUND

An electrical grid is an interconnected network for delivering electricity from suppliers to consumers. More specifically, the electrical grid is a vast, interconnected network of transmission lines, starting from a supplier of electricity to a consumer of the electricity. The consumer may be, for example, a personal consumer or an industrial consumer.

It has become increasingly important to manage the electrical grid, in order to more efficiently distribute electricity in an environmentally friendly manner. For example, the electrical grid has started to be connected to low or zero emission sources such as, e.g., windmills, hydropower plants and solar panels. In another example, electricity suppliers are providing discounted fees for off-peak electricity consumption, e.g., providing cost incentives to consumers for those using their appliances during off-peak times.

Also, it has become more vital to manage the electrical grid to distribute electricity in a more efficient manner. Electricity suppliers must often monitor their electrical grids for downed power lines to prevent such problems from disrupting electricity supply throughout the grids. For example, natural disasters or incidents, such as a tree falling on a power distribution line, may generate transient or sustained electrical faults in the electrical grid, thus causing temporary local or wide-area power outages. In order to provide reliable power, electricity suppliers must be able to detect such electrical faults.

However, electricity suppliers are often not provided with enough information regarding the electrical grid to effectively monitor the grid during power outages, peak demand times, etc. For example, to monitor the electrical grid, the electricity suppliers may depend on data sensed from devices of field crews deployed to portions of the electrical grid. However, if for those portions where the field crews are not deployed to and gathering data, the electricity suppliers may have to estimate a state of the electrical grid instead of accurately measuring the state of the electrical grid. In addition, the electrical suppliers are currently constrained by the limited number of parameters being monitored on the electrical grid due to, e.g., safety constraints for the field crews.

SUMMARY

In a first aspect of the invention, a method includes synchronizing state information associated with one or more electrical devices on an electrical grid, with time information. The method further includes notifying one or more subscribing devices of the synchronized state information such that the one or more subscribing devices monitors and controls the one or more electrical devices based on the synchronized state information.

In another aspect of the invention, a system is implemented in hardware which includes a computer infrastructure operable to receive one or more subscriptions from one or more subscribing devices that indicate that the one or more subscribing devices request to receive state information associated with one or more electrical devices on an electrical grid. The computer infrastructure is further operable to synchronize the state information with time information. The computer infrastructure is further operable to notify the one or more subscribing devices of the synchronized state information based on the one or more subscriptions such that the one or more subscribing devices monitors and controls the one or more electrical devices based on the synchronized state information.

In an additional aspect of the invention, a computer program product includes a tangible computer usable storage medium having readable program code embodied in the tangible computer usable storage medium. The computer program product includes at least one component operable to synchronize state information associated with one or more electrical devices on an electrical grid, with time information. The at least one component is further operable to notify a subscribing device of the synchronized state information such that the subscribing device at least one of monitors and controls the one or more electrical devices based on the synchronized state information.

In a further aspect of the invention, a method for monitoring and optimizing an electrical grid state, including providing a computer infrastructure, being operable to measure state information associated with one or more electrical devices of an electrical grid. The computer infrastructure is further operable to synchronize the state information with time information such that the synchronized state information is transmitted to a subscribing device which at least one or monitors and controls the one or more electrical devices based on the synchronized state information.

In another aspect of the invention, a computer system for monitoring and optimizing an electrical grid state includes a CPU, a computer readable memory and a computer readable storage media. First program instructions receive one or more subscriptions from one or more subscribing devices that indicate that the one or more subscribing devices request to receive state information associated with one or more electrical devices on an electrical grid, the state information comprising at least one phasor measurement of the one or more electrical devices. Second program instructions synchronize the state information with time information from at least one of a Global Position System (GPS), a Network Time Protocol (NTP), and radio frequency (RF) synchronization. Third program instructions notify the one or more subscribing devices of the synchronized state information based on the one or more subscriptions such that the one or more subscribing devices monitors and controls the one or more electrical devices based on the synchronized state information. The first, second, and third program instructions are stored on the computer readable storage media for execution by the CPU via the computer readable memory.

BRIEF DESCRIPTION OF THE SEVERAL VIEWS OF THE DRAWINGS

The present invention is described in the detailed description which follows, in reference to the noted plurality of drawings by way of non-limiting examples of exemplary embodiments of the present invention.

DETAILED DESCRIPTION

Figure 1:
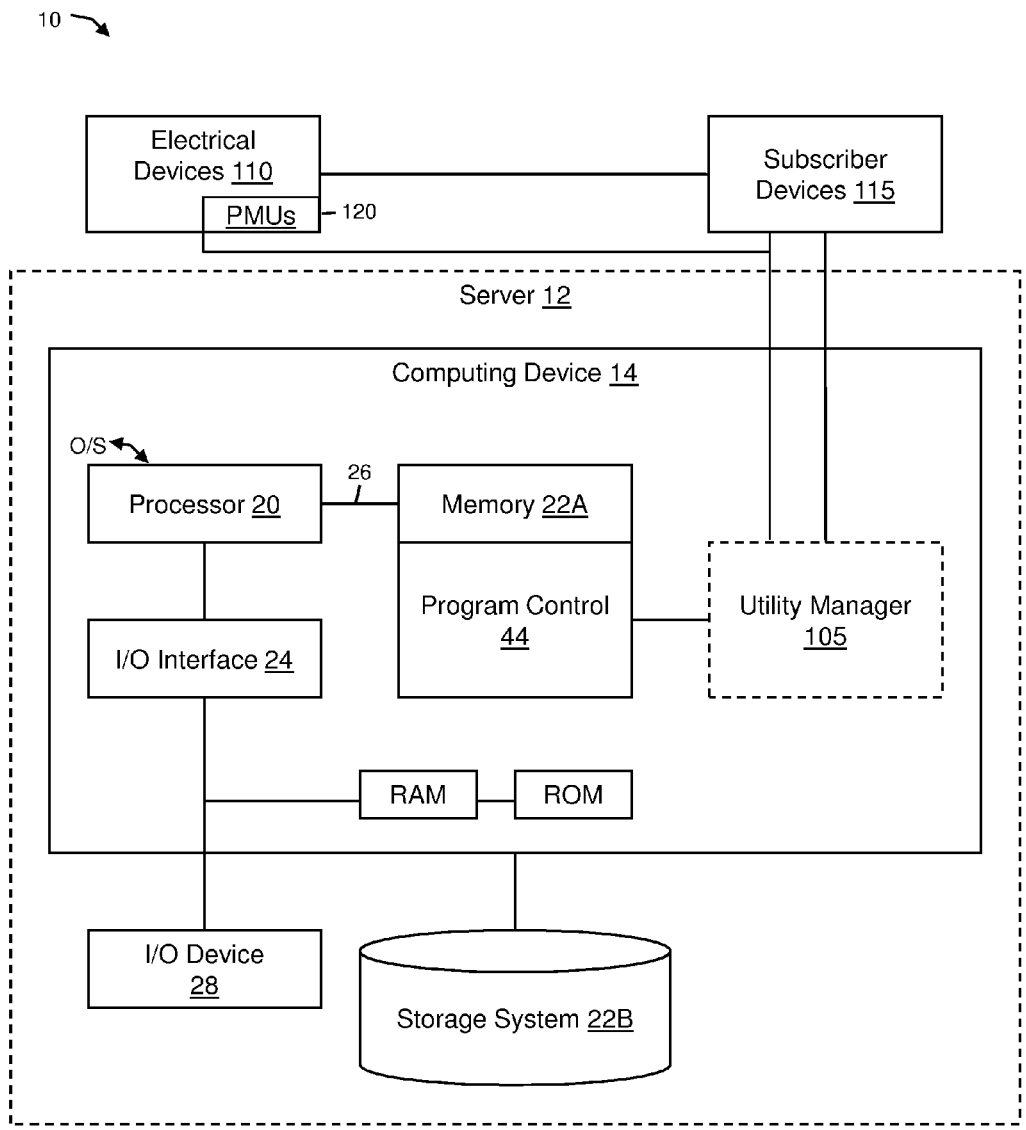
FIG. 1 shows an illustrative environment of a server and/or a computing device for implementing steps in accordance with aspects of the invention.

The present invention generally relates to electrical grids, and more particularly, to a system and a method for monitoring and optimizing a state of an electrical grid. In embodiments, the present invention provides one or more phasor measurement units (PMUs) associated with one or more electrical devices (e.g., fuses, transformers, circuit breakers, etc.) of an electrical grid. Each of the PMUs can measure state information of one of the electrical devices, and send the measured state information to a utility manager via, e.g., Session Initiation Protocol (SIP) and/or Instant Messaging Protocol (IMP). In embodiments, the state information may include, for example, a voltage, a phase, and/or a current, of one of the electrical devices. Advantageously, a utility, electricity supplier or service provider which operates the utility manager, does not need to estimate a state of the electrical grid, but may rely on the real-time state information to respond to certain events (e.g., electrical faults) on the electrical grid that could destabilize the electrical grid.

In embodiments, each of the PMUs can further synchronize the state information with time information from, e.g., Global Positioning System (GPS), Network Time Protocol (NTP), and/or radio frequency (RF) synchronization, before sending the state information to the utility manager. The synchronizing may include adding the time information as a timestamp to the state information. In alternative or additional embodiments, upon receipt of the state information, the utility manager may synchronize the state information with the time information from, e.g., the GPS, the NTP, and/or the RF synchronization. To synchronize the state information with a time which the state information is measured by the respective one of the PMUs, the utility manager may further synchronize the state information with (e.g., add to or subtract from the time information) a drift correlation (e.g., an upper and/or lower bound of drift time). This adjustment to the time information accounts for a delay between the measuring of the state information at the respective one of the PMUs and the receiving of the state information at the utility manager. Advantageously, the utility, via the utility manager, may determine a time of the state information, time correlate the state information with other state information measured at other electrical devices, and/or monitor the electrical grid for emergency situations based on the timed state information. That is, the utility may observe state information of electrical devices at various regions of the electrical grid, at a certain time, and analyze a state of the electrical grid based on such observations.

In accordance with further aspects of the invention, the utility manager can automatically notify subscribing watchers of the timed state information via, e.g., the SIP or IMP. For example, the utility manager may notify a subscribing Supervisory Control and Data Acquisition (SCADA) system of the timed state information, and provide the SCADA system accurate, time-synchronized and frequent state information of the electrical devices such that the SCADA system may make appropriate control decisions associated with the electrical grid. More specifically, the SCADA system may control the electrical grid by sending a SIP-based command message to the electrical devices to reconfigure the electrical devices, e.g., to isolate electrical faults detected at the electrical devices. Accordingly, management of the electrical devices may be accomplished remotely via the utility manager and/or the SCADA system subscribing to, receiving, and responding to the timed state information of the electrical devices.

System Environment

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 shows an illustrative environment 10 for managing the processes in accordance with the invention. To this extent, the environment 10 includes a server or other computing system 12 that can perform the processes described herein. In particular, the server 12 includes a computing device 14. The computing device 14 can be resident on a network infrastructure or computing device of a third party service provider (any of which is generally represented in FIG. 1).

The computing device 14 includes a processor 20, memory 22A, an I/O interface 24, and a bus 26. The memory 22A can include local memory employed during actual execution of program code, bulk storage, and cache memories which provide temporary storage of at least some program code in order to reduce the number of times code must be retrieved from bulk storage during execution. In addition, the computing device includes random access memory (RAM), a read-only memory (ROM), and an operating system (O/S).

The computing device 14 is in communication with the external I/O device 28 and the storage system 22B. For example, the I/O device 28 can comprise any device that enables an individual to interact with the computing device 14 (e.g., user interface) or any device that enables the computing device 14 to communicate with one or more other computing devices using any type of communications link. The external I/O device 28 may be, for example, a handheld device, PDA, handset, keyboard, etc.

In general, the processor 20 executes computer program code (e.g., program control 44), which can be stored in the memory 22A and/or storage system 22B. Moreover, in accordance with aspects of the invention, the program control 44 controls a utility manager 105, e.g., the processes described herein. The utility manager 105 communicates with one or more electrical devices 110 (on an electrical grid) and one or more subscriber devices 115. The communication between the utility manager 105, the electrical devices 110, and the subscriber devices 115 can be through, for example, Session Initiation Protocol (SIP) messaging, Instant Messaging Protocol (IMP) messaging, or other communication protocols.

As should be understood by those of skill in the art, the SIP is a signaling protocol widely used for controlling multimedia communication sessions, such as voice and video calls over Internet Protocol (IP). The SIP can be used for creating, modifying, and terminating two-party (unicast) or multiparty (multicast) sessions consisting of one or several media streams. In embodiments, the present invention implements the SIP as video conferencing, streaming multimedia distribution, instant messaging, presence information and/or file transfer applications. In embodiments, the SIP can be implemented as a text-based protocol, incorporating many elements of the Hypertext Transfer Protocol (HTTP) and the Simple Mail Transfer Protocol (SMTP). Also, as used in the present invention, the SIP is an Application Layer protocol designed to be independent of the underlying transport layer, and as such, can run on Transmission Control Protocol (TCP), User Datagram Protocol (UDP), or Stream Control Transmission Protocol (SCTP).

In embodiments, the utility manager 105 can be implemented as one or more program code in the program control 44 stored in memory 22A as separate or combined modules. Additionally, the utility manager 105 may be implemented as separate dedicated processors or a single or several processors to provide the function of this tool. Moreover, it should be understood by those of ordinary skill in the art that the utility manager 105 is used as a general descriptive term for providing the features and/or functions of the present invention, and that the utility manager 105 may comprise many different components such as, for example, components and/or infrastructure described and shown with reference to FIGS. 2-3.

In accordance with further aspects of the invention, the electrical devices 110 can be various types of devices involved in the generation, transmission, and/or distribution of electricity on an electrical grid such as, for example, fuses, transformers, circuit breakers, capacitors, voltage regulators, compensators, relays, feeders, switches, protection devices, gateways (e.g., routers), solar panels, plug-in electric vehicles, and/or other electrical grid infrastructure devices. The electrical devices 110 may be located at, e.g., an electrical substation, a power station, a building (e.g., a hospital), and/or anywhere along a transmission line, on the electrical grid. Further, the electrical devices 110 may be located within various types of electrical grids, e.g., a low-voltage (up to 60 kilovolts (kV)) grid, a high-voltage (110 kV and up) grid, and/or an extra high-voltage (265 kV and up, AC and high-voltage DC (HVDC)) grid. Each of the electrical devices 110 may include a lightweight SIP client and a radio antenna connected to the SIP client, allowing the electrical devices 110 to communicate in the SIP with other entities that can also communicate in the SIP, such as the utility manager 105 and the subscriber devices 115.

In embodiments, each of the electrical devices 110 includes one or more phasor measurement units (PMUs) 120. Each of the PMUs 120 can measure state information of one of the electrical devices 110, and can send the measured state information to the utility manager 105 and/or the subscriber devices 115 via, e.g., the SIP and/or the IMP. Advantageously, a utility, electricity supplier or service provider does not need to estimate a state of the electrical grid, but can rely on the real-time state information to respond to certain events (e.g., electrical faults) on the electrical grid that could destabilize the electrical grid. The state information may include, for example, a voltage, a phase, and/or a current, of one of the electrical devices 110. The state information may initially be in electrical wave forms, and each of the PMUs 120 may convert these electrical wave forms into digital signals, using digital signal processing techniques generated at a predetermined sampling rate, with, e.g., a Global Position System (GPS) synchronized time.

In accordance with further aspects of the present invention, each of the PMUs 120 can further synchronize the state information with time information from, e.g., the GPS, Network Time Protocol (NTP), and/or radio frequency (RF) synchronization, before sending the state information to the utility manager 105 and/or the subscriber devices 115. In embodiments, the synchronizing may include adding the time information as a timestamp to the state information. Advantageously, the utility, via the utility manager 105, may receive a time which the state information is measured and/or an event is detected at one of the electrical devices 110. The timed state information may assist the utility in making observations regarding a state of the electrical grid over time. For example, the utility may observe that a voltage measured at one of the electrical devices 110 is increasing over time at a rate greater than an allowed threshold. In addition, the utility may time correlate the state information and/or the event with other state information and/or events at other electrical devices, and observe a state of the electrical grid at a certain time and at a larger granularity, e.g., at a particular, wider region of the electrical grid that includes the electrical devices 110 and the other electrical devices. The utility may monitor the electrical grid for emergency situations based on the timed state information and/or the event, and respond to such emergency situations.

With distributed analytics and filtering capabilities, each of the PMUs 120 can send different data sets of the state information, such as: 1) a data set such that a watcher (e.g., the utility manger 105) may measure a particular phasor (e.g., the voltage, phase, and/or current) of one of the electrical devices 110; 2) a data set such that a watcher may monitor an asset (e.g., one of the electrical devices 110); 3) a data set such that a watcher may monitor a condition (e.g., an electrical fault) of one of the electrical devices 110; and 4) a data set for use by a Supervisory Control and Data Acquisition (SCADA) system which monitors the state of the electrical grid.

Before the utility manager 105 receives the state information of the electrical devices 110, the utility manager 105 can receive one or more subscriptions from one or more watchers and/or the subscriber devices 115 that indicate that these entities request to receive the state information from the utility manager 105 when the state information is available and/or changed. In embodiments, the subscriptions may include particular data sets (e.g., the voltage, phase, and/or current) of the state information that the watchers and/or the subscriber devices 115 request to receive when available and/or changed. The watchers may include any type of network entities which require the state information, such as, for example, a SCADA system and/or a Phasor Data Concentrator (PDC) which aggregate one or more phasors (e.g., the voltage, phase, and/or current) of the electrical devices 110. The watcher may include the utility manager 105 itself, as a network entity which subscribes to the state information.

Once the utility manager 105 receives the state information of the electrical devices 110, the utility manager 105 can synchronize the state information with the time information from, e.g., the GPS, the NTP, and/or the RF synchronization. The synchronizing may include adding the time information as a timestamp to the state information. In embodiments, to synchronize the state information with a time which the state information is measured by the respective one of the PMUs 120, the utility manager 105 may further synchronize the state information with (e.g., add to or subtract from the time information) a drift correlation (e.g., an upper and/or lower bound of drift time). The drift correlation may be a predetermined value to account for a delay between the measuring of the state information at the respective one of the PMUs 120 and the receiving of the state information at the utility manager 105. Advantageously, the state information of the electrical devices 110 may be synchronized to an atomic clock, and the utility (e.g., via the utility manager 105) may observe how the electrical grid is operating in time and may make assertions based on the observations. In addition, the utility may, for a certain time, observe how an electrical device (e.g., one of the electrical devices 110) relates to other electrical devices, by time correlating the state information with other state information of the other electrical devices.

Based on the received subscriptions, the utility manager 105 may automatically notify the subscribing watchers and/or the subscriber devices 115 of the timed state information via, e.g., SIP-based messages. For example, the utility manager 105 may notify a subscribing SCADA system of the timed state information, and provide the SCADA system accurate, time-synchronized and frequent state information of the electrical devices 110 such that the SCADA system may make appropriate control decisions associated with the electrical grid.

In embodiments, through the use of rules stored in the storage system 22B, for example, the utility manager 105 and/or the SCADA system can send a SIP-based command message to the electrical devices 110 to reconfigure the electrical devices 110. The rules may indicate what constitutes critical events (e.g., electrical faults) at the electrical devices 110 and how to manage the electrical devices 110 upon the occurrence of the critical events (e.g., isolate the electrical faults via a command message to the electrical devices 110). Accordingly, management of the electrical devices 110 may be accomplished remotely via the utility manager 105 and/or the SCADA system subscribing to, receiving, and responding to the state information of the electrical devices 110.

In operation, for example, the utility manager 105 can be located at an electrical substation on an electrical grid. The utility manager 105 may subscribe to and receive from one of the electrical devices 110 (and/or one of the associated PMUs 120) a SIP-based message including a particular phasor (e.g., a voltage, phase, or current) detected at the one of the electrical devices 110 and a time in which the phasor is detected. In response to this message, the utility manager 105 may determine at least one rule indicating at least one action to take, and perform the action to take based on the message. For example, the determined rule may include a defined, centralized remedial action scheme that instructs the utility manager 105 to isolate the electrical devices 110 from the electrical grid (e.g., reroute power away from the electrical devices 110) when the detected phasor is greater than a predetermined threshold at a certain time. If the detected phasor is greater than the predetermined threshold at the certain time, the utility manager 105 may send a SIP-based command message to the electrical devices 110 to isolate the electrical devices 110 from the electrical grid.

In embodiments, the subscriber devices 115 (e.g., smartphones, personal computers (PC), laptops, etc.) are in communication with the utility manager 105 and/or the electrical devices 110. For example, the subscriber devices 115 can be used by a field crew of the utility to receive the state information of the electrical devices 110, from the utility manager 105 and/or directly from the electrical devices 110. The subscriber devices 115 may be further used to receive instructions (e.g., record measurements and/or make repairs) associated with the electrical devices 110, from the utility manager 105. Each of the subscriber devices 115 may include a lightweight SIP or IMP client and a radio antenna connected to the SIP or IMP client, allowing the subscriber devices 115 to communicate in the SIP or the IMP with other entities that can also communicate in the SIP or the IMP, such as the utility manager 105 and the electrical devices 110. Each of the subscriber devices 115 may also include a web client that allows the subscriber devices 115 to communicate in Hypertext Transfer Protocol (HTTP) with other entities that can also communicate in the HTTP, e.g., the utility manager 105.

In implementation, the subscriber devices 115 can send and receive messages to and from the utility manager 105 in order to manage the electrical devices 110. For example, through SIP messaging, the subscriber devices 115 may subscribe to and receive the state information from the electrical devices 110, to interact with and detect conditions (e.g., electrical faults) of the electrical devices 110. The subscriber devices 115 may also send a request to the utility manager 105 for the state information of the electrical devices 110.

Advantageously, by using SIP and/or IMP messaging between the utility manager 105, the electrical devices 110, the subscriber devices 115, the PMUs 120, and/or other watchers subscribing to state information of the electrical devices 110, the present invention provides a low latency, scalable, and extensible monitoring and optimizing system for electrical grids. The present invention further promotes a communication standard to enable the PMUs 120 to provide the state information of the electrical devices 110 and associated time information to different types of monitoring systems, such as, for example, a PDC, a SCADA system, etc.

While executing the computer program code, the processor 20 can read and/or write data to/from memory 22A, storage system 22B, and/or I/O interface 24. The program code executes the processes of the invention, for example, functions of a presence server, e.g., managing the electrical devices 110 of the electrical grid. The bus 26 provides a communications link between each of the components in the computing device 14.

The computing device 14 can comprise any general purpose computing article of manufacture capable of executing computer program code installed thereon (e.g., a personal computer, server, etc.). However, it is understood that the computing device 14 is only representative of various possible equivalent-computing devices that may perform the processes described herein. To this extent, in embodiments, the functionality provided by the computing device 14 can be implemented by a computing article of manufacture that includes any combination of general and/or specific purpose hardware and/or computer program code. In each embodiment, the program code and hardware can be created using standard programming and engineering techniques, respectively.

Similarly, the computing infrastructure 12 is only illustrative of various types of computer infrastructures for implementing the invention. For example, in embodiments, the server 12 comprises two or more computing devices (e.g., a server cluster) that communicate over any type of communications link, such as a network, a shared memory, or the like, to perform the process described herein. Further, while performing the processes described herein, one or more computing devices on the server 12 can communicate with one or more other computing devices external to the server 12 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

Figure 2:
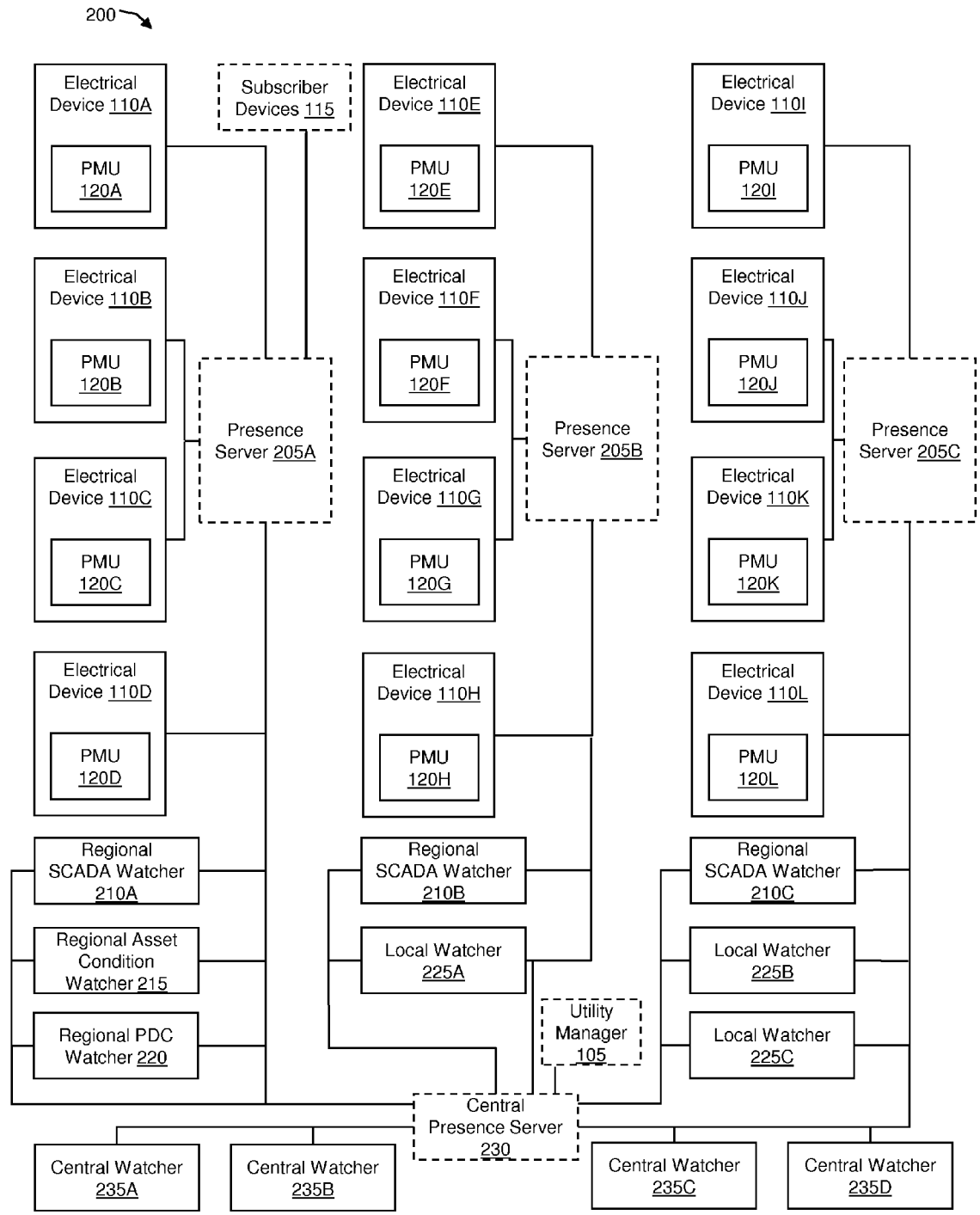
FIG. 2 shows an illustrative environment for implementing the steps in accordance with aspects of the invention.

FIG. 2 shows an illustrative environment 200 for implementing the steps in accordance with aspects of the invention. In embodiments, the environment 200 includes the utility manager 105, the electrical devices, and the subscriber devices 115, in FIG. 1, and presence servers 205A, 205B, and 205C. The electrical devices can include electrical devices 110A, 110B, 110C, 110D, 110E, 110F, 110G, 110H, 110I, 110J, 110K, and 110L, which may be located at various premises (e.g., a hospital and/or a home) and/or electrical sub-grids, on an electrical grid. The electrical devices 110A-110L include the PMUs in FIG. 1. More specifically, the electrical devices 110A, 110B, 110C, 110D, 110E, 110F, 110G, 110H, 110I, 110J, 110K, 110L include PMUs 120A, 120B, 120C, 120D, 120E, 120F, 120G, 120H, 120I, 120J, 120K, and 120L, respectively.

In embodiments, each of the PMUs 120A-120L can measure state information of one of the electrical devices 110A-110L, and send the measured state information to the utility manager 105, the subscriber devices 115, and/or the presence servers 205A, 205B, 205C via, e.g., Session Internet Protocol (SIP) and/or Internet Messaging Protocol (IMP). Advantageously, a utility, electricity supplier or service provider does not need to estimate a state of the electrical grid, but can rely on the real-time state information to respond to certain events (e.g., electrical faults) on the electrical grid that could destabilize the electrical grid. The state information may include, for example, a voltage, a phase, and/or a current, of one of the electrical devices 110A-110L. The state information may initially be in electrical wave forms, and each of the PMUs 120A-120L may convert these electrical wave forms into digital signals, using digital signal processing techniques generated at a predetermined sampling rate, with, e.g., a Global Position System (GPS) synchronized time.

In accordance with further aspects of the invention, each of the PMUs 120A-120L can further synchronize the state information with time information from, e.g., the GPS, Network Time Protocol (NTP), and/or radio frequency (RF) synchronization, before sending the state information to the utility manager 105, the subscriber devices 115, and/or the presence servers 205A, 205B, 205C. In embodiments, the synchronizing may include adding the time information as a timestamp to the state information. In this way, each of the PMUs 120A-120L may send the time-synchronized or time-stamped state information so that a receiving network entity (e.g., the utility manager 105) may manage the electrical grid knowing the time the state information is measured and observe a state of the electrical grid over time.

Advantageously, the utility can also time correlate the state information and/or event detected at the one of the electrical devices 110A-110L with other state information and/or events detected at other electrical devices, to observe a state of the electrical grid at a certain time over a larger granularity, e.g., a particular region of the electrical grid including the electrical devices 110A-110L and the other electrical devices. The utility may monitor the electrical grid for emergency situations based on the timed state information and/or the event, and any time-related information. With distributed analytics and filtering capabilities, each of the PMUs 120A-120L may send different data sets of the state information, such as: 1) a data set such that a watcher (e.g., the utility manager 105) may measure a particular phasor (e.g., the voltage, phase, and/or current) of one of the electrical devices 110A-110L; 2) a data set such that the watcher may monitor an asset (e.g., one of the electrical devices 110A-110L); 3) a data set such that the watcher may monitor a condition (e.g., an electrical fault) of one of the electrical devices 110A-110L; and 4) a data set for use by a Supervisory Control and Data Acquisition (SCADA) system which monitors the state of the electrical grid.

In embodiments, the presence servers 205A, 205B, 205C can be located at premises of a utility (e.g., a service provider) and/or an electrical grid, e.g., a building (e.g., a hospital and/or a home), a utility control center, a power station, a fuse, etc. For example, the electrical devices 110A, 110B, 110C, 110D and the presence server 205A may be located at a first region of the electrical grid, while the electrical devices 110E, 110F, 110G, 110H and the presence server 205B may be located at a second region of the electrical grid. The presence servers 205A, 205B, 205C may be in communication over, e.g., the SIP or the IMP, with the utility manager 105 (shown in connection to and/or implemented in a central presence server 230), the electrical devices 110A-110L, the subscriber devices 115 (shown in connection to the presence server 205A), and the PMUs 120A-120L. The utility manager 105 may be connected to and/or implemented in the presence servers 205A, 205B, and/or 205C. The subscriber devices 115 may be also connected to the presence servers 205A, 205B, and/or 205C. As shown, the electrical devices 110A, 110B, 110C, 110D are connected to the presence server 205A; the electrical devices 110E, 110F, 110G, 110H are connected to the presence server 205B; and the electrical devices 110I, 110J, 110K, 110L are connected to the presence server 205C. One of ordinary skill in the art would recognize that the electrical devices 110A-110L could be connected to any of the presence server 205A, 205B, 205C.

In accordance with further aspects of the invention, the presence servers 205A, 205B, 205C can receive one or more subscriptions from one or more watchers and/or the subscriber devices 115 that indicate that these entities request to receive the state information from the presence servers 205A, 205B, 205C when the state information is available and/or changed. In embodiments, the subscriptions may include particular data sets (e.g., the voltage, phase, and/or current) of the state information that the watchers and/or the subscriber devices 115 request to receive when available and/or changed. In alternative or additional embodiments, the subscriptions may indicate that the watchers and/or the subscriber devices 115 request to receive the state information when specific parameters (e.g., the voltage, phase, and/or current) reach a predetermined threshold. In addition, the watchers and/or the subscriber devices 115 may request to receive the state information of a specific electrical device, a set of electrical devices, and/or all electrical devices. The presence servers 205A, 205B, 205C may store the received subscriptions in a presence document via, e.g., XML Configuration Access Protocol (XCAP). The watchers may include any type of network entities which require the state information, such as, for example, a SCADA system and/or a Phasor Data Concentrator (PDC) which aggregate one or more phasors (e.g., the voltage, phase, and/or current) of the electrical devices 110A-110L. The watcher may include the utility manager 105, as a network entity which subscribes to the state information.

Once the presence servers 205A, 205B, 205C receive the state information of the electrical devices 110A-110L, the presence servers 205A, 205B, 205C can synchronize the state information with the time information from, e.g., the GPS, the NTP, and/or the RF synchronization. In embodiments, the synchronizing may include adding the time information as a timestamp to the state information. In embodiments, to synchronize the state information with a time which the state information is measured by the respective one of the PMUs 120A-120L, the presence servers 205A, 205B, 205C may further synchronize the state information with (e.g., adding to or subtracting from the state information) a drift correlation (e.g., an upper and/or lower bound of drift time). The drift correlation may be a predetermined value which accounts for a delay or lag between the measuring of the state information at the respective one of the PMUs 120A-120L and the receiving of the state information at the presence servers 205A, 205B, 205C. Advantageously, the state information of the electrical devices 110A-110L may be synchronized to an atomic clock, and the utility, via the presence servers 205A, 205B, 205C may observe how the electrical grid is operating in time and may make assertions based on the observations. In addition, the utility may, for a certain time, observe how an electrical device (e.g., one of the electrical devices 110) relates to other electrical devices, by time correlating the state information with other state information of the other electrical devices. This provides the utility with the ability to monitor a state of the electrical grid at a larger granularity, e.g., at a particular region including multiple electrical devices instead only one or two electrical devices.

Based on the received subscriptions, the presence servers 205A, 205B, 205C may automatically notify the subscribing watchers and/or the subscriber devices 115 of the timed state information via, e.g., SIP-based messages. In embodiments, the presence server 205A can further be in communication with a regional SCADA watcher 210A, a regional asset condition watcher 215, a regional PDC watcher 220; the presence server 205B can be in communication with a regional SCADA watcher 210B and a local watcher 225A; and the presence server 205C can be in communication with a regional SCADA watcher 210C, a local watcher 225B, and a local watcher 225C. More specifically, the presence servers 205A, 205B, 205C may notify the watchers 210A, 210B, 210C, 215, 220, 225A, 225B, 225C of the timed state information of the electrical devices 110A-110L if subscribed to the state information. Each of the regional SCADA watchers 210A, 210B, 210C may include a SCADA system located in a particular region of the electrical grid and operated by, e.g., a regional utility or electricity supplier. Each of the regional SCADA watchers 210A, 210B, 210C may make appropriate control decisions associated with the electrical grid based on the received state information of the electrical devices 110A-110L. For example, each of the regional SCADA watchers 210A, 210B, 210C may send a SIP-based command message to the electrical devices 110A-110L to reconfigure the electrical devices 110A-110L, e.g., to isolate the electrical devices 110A-110L from an electrical fault detected at the electrical devices 110A-110L. Accordingly, management of the electrical devices 110A-110L may be accomplished remotely via the regional SCADA watchers 210A, 210B, 210C subscribing to, receiving, and responding to the state information of the electrical devices 110A-110L.

In accordance with further aspects of the invention, each of the regional asset condition watcher 215, the regional PDC watcher 220, and the local watchers 225A, 225B, 225C can be located in a particular region of the electrical grid and operated by, e.g., a regional utility or electricity supplier. The regional asset condition watcher 215 may determine or detect a condition (e.g., a stable condition and/or an electrical fault condition) of the electrical devices 110A-110L in a particular region based on the state information received from the electrical devices 110A-110L, and may alert the regional utility of the condition of the electrical devices 110A-110L. The regional PDC watcher 220 may include a PDC which aggregates one or more phasors (e.g., the voltage, phase, and/or current) of the electrical devices 110A-110L in a particular region based on the state information received from the electrical devices 110A-110L. The local watchers 225A, 225B, 225C may include any type of network entities (e.g., a SCADA system and/or a PDC) which request and utilize the state information received from the electrical devices 110A-110L. Each of the regional asset condition watcher 215, the regional PDC watcher 220, and the local watchers 225A, 225B, 225C may make appropriate control decisions associated with the electrical grid based on the received state information of the electrical devices 110A-110L. For example, each of the regional asset condition watcher 215, the regional PDC watcher 220, and the local watchers 225A, 225B, 225C may send a SIP-based command message to the electrical devices 110A-110L to reconfigure the electrical devices 110A-110L.

In embodiments, each of the presence servers 205A, 205B, 205C and the watchers 210A, 210B, 210C, 215, 220, 225A, 225B, 225C may further be in communication with the central presence server 230 over, e.g., the SIP, the IMP, and/or Hypertext Transfer Protocol (HTTP). The central presence server 230 may be located in a back end, centralized premise of the utility or electricity supplier, e.g., a distribution, transmission, and generation control center, an Independent System Operator (ISO)/Regional Transmission Organization (RTO) grid control center, etc. In alternative embodiments, the utility manager 105 may be located at and/or implemented in the central presence server 230. The central presence server 230 may further be in communication with central watchers 235A, 235B, 235C, and 235D over, e.g., the SIP, the IMP, and/or the HTTP. The central watchers 235A, 235B, 235C, 235D may also be located in the back end, centralized premise of the utility, and the utility manager 105 may be located at and/or implemented in any of the central watchers 235A, 235B, 235C, 235D.

In accordance with further aspects of the invention, the central presence server 230 can receive the state information of the electrical devices 110A-110L from the presence servers 205A, 205B, 205C and/or the watchers 210A, 210B, 210C, 215, 220, 225A, 225B, 225C. The central presence server 230 may further receive processed information from the watchers 210A, 210B, 210C, 215, 220, 225A, 225B, 225C. For example, the regional SCADA watchers 210A, 210B, 210C may watch the presence servers 205A, 205B, 205C, respectively, for the state information of the electrical devices 110A-110L. Upon receipt of the state information, the regional SCADA watchers 210A, 210B, 210C may process the state information to determine, e.g., whether there is an electrical fault at the electrical devices in their respective regions. The regional SCADA watchers 210A, 210B, 210C may further send the processed information (e.g., indications whether there is an electrical fault at the electrical devices in their respective regions) to the central presence server 230, which may distribute the processed information for further processing, analysis, and/or corrective actions.

In embodiments, the central presence server 230 may receive one or more subscriptions from the central watchers 235A, 235B, 235C, 235D that indicate that these entities request to receive the state information from the central presence server 230 when the state information is available and/or changed. The central watchers 235A, 235B, 235C, 235D may include any type of network entities which require the state information, such as, for example, a SCADA system and/or a PDC. The watcher may include the utility manager 105, as a network entity which subscribes to the state information.

Once the central presence server 230 receives the state information of the electrical devices 110A-110L, the central presence server 230 can synchronize the state information with the time information from, e.g., the GPS. In embodiments, to synchronize the state information with a time which the state information is measured by the respective one of the PMUs 120A-120L, the central presence server 230 may further synchronize the state information with a drift correlation (e.g., an upper and/or lower bound of drift time) to account for a delay between the measuring and the receiving of the state information. Based on the received subscriptions, the central presence server 230 may automatically notify the central watchers 235A, 235B, 235C, 235D of the timed state information, e.g., via SIP-based messages.

In embodiments, each of the central watchers 235A, 235B, 235C, 235D can monitor and determine a state of the electrical grid based on the state information of the electrical devices 110A-110L in all of the various regions of the electrical grid. Each of the central watchers 235A, 235B, 235C, 235D may further make appropriate control decisions associated with the electrical grid based on the received state information of the electrical devices 110A-110L. For example, each of the central watchers 235A, 235B, 235C, 235D may send a SIP-based command message to the electrical devices 110A-110L to reconfigure the electrical devices 110A-110L.

For example, in a reactive fault isolation operation, a presence server (e.g., one of the presence servers 205A, 205B, 205C) can receive a SIP-based notification message from an electrical device (e.g., one of the electrical devices 110A-110L) located at, for example, a building, a grid, a power station, etc. In embodiments, the notification message may include a fault detection notification message which indicates that an electrical fault or abnormal condition has been detected locally by the electrical device.

In a centralized approach, the presence server can forward the notification message, through any of watchers (e.g., the watchers 210A, 210B, 210C, 215, 220, 225A, 225B, 225C) connected to the presence server, to the central presence server 230. At least one authorized watcher (e.g., the utility manager 105) in the utility back end may be subscribed to the central presence server 230 to watch for (e.g., receive) the notification message. In embodiments, the watcher may include a SCADA system that, in response to the notification message, issues a SIP-based alarm message to be displayed to a system operator responsible for a particular region where the electrical fault is located. The SCADA system may also suggest a possible reconfiguration of the electrical device and nearby electrical devices to isolate (e.g., reroute power away from) the electrical fault, in which the system operator decides how to react to the electrical fault and/or issue switching steps to isolate the electrical fault.

In embodiments, the watcher may include a generation, transmission, distribution or outage management system that, in response to the notification message, evaluates an extent of the electrical fault, a blackout area, and/or an instable section of an electrical grid, and identifies (automatically or manually) switching steps to isolate the electrical fault. Such steps may be executed by sending SIP-based command messages to electrical devices (e.g., switches) on the electrical grid, via the presence servers 205A, 205B, 205C. For example, the command message may include a fault isolation command message that instructs the electrical devices to execute requested configuration changes (e.g., switch on or off) aimed at isolating the electrical fault or abnormal condition. Advantageously, the present invention allows the utility to interact with (e.g., monitor and control) a wide range of electrical devices on an electrical grid in a centralized manner, and to optimize the electrical grid (e.g., isolate electrical faults, avoiding cascading events, such as further blackouts in areas of the electrical faults).

In a decentralized approach, at least one authorized watcher (e.g., the subscriber devices 115 and/or the watchers 210A, 210B, 210C, 215, 220, 225A, 225B, 225C) located at a particular region of the electrical grid can be responsible for monitoring and optimizing an electrical device (e.g., one of the electrical devices 110A-110L). The watcher may be subscribed to a presence server (e.g., the presence servers 205A, 205B, 205C) to watch for (e.g., receive) the notification message from the electrical device. In embodiments, the watcher may receive the notification message, synchronize the notification message with time information from, e.g., the GPS, and determine with accuracy and precision a current electrical state of the electrical device. If the electrical state of the electrical device indicates an electrical fault at the electrical device, the watcher may initiate automatic switching steps to isolate the electrical fault. For example, these switching steps may be executed by sending SIP-based command messages to electrical devices (e.g., switches) on the electrical grid. The command message may include a fault isolation command message that instructs the electrical devices to execute requested configuration changes (e.g., switch on or off) aimed at isolating the electrical fault or abnormal condition. Advantageously, the scalable decentralized approach of the present invention enables faster electrical grid optimization (e.g., fault isolation), is closer to a self-healing system, and allows for electrical grid optimization even when incidents (e.g., blackouts, communication network problems) cause the particular region of the electrical grid to be cut off from the utility back end.

In a hybrid (centralized and decentralized) approach, the watcher in the particular region of the electrical grid can forward the notification message, along with any switching steps already performed, to a watcher (e.g., the utility manager 105) in the utility back end. The utility back end watcher may take additional steps ensure the stability of the electrical grid, such as send additional command messages to other electrical devices to isolate electrical faults. Further, once the electrical faults are isolated, the utility back end watcher may initiate an automated or manual service restoration process to restore power to as many customers as possible.

Figure 3:
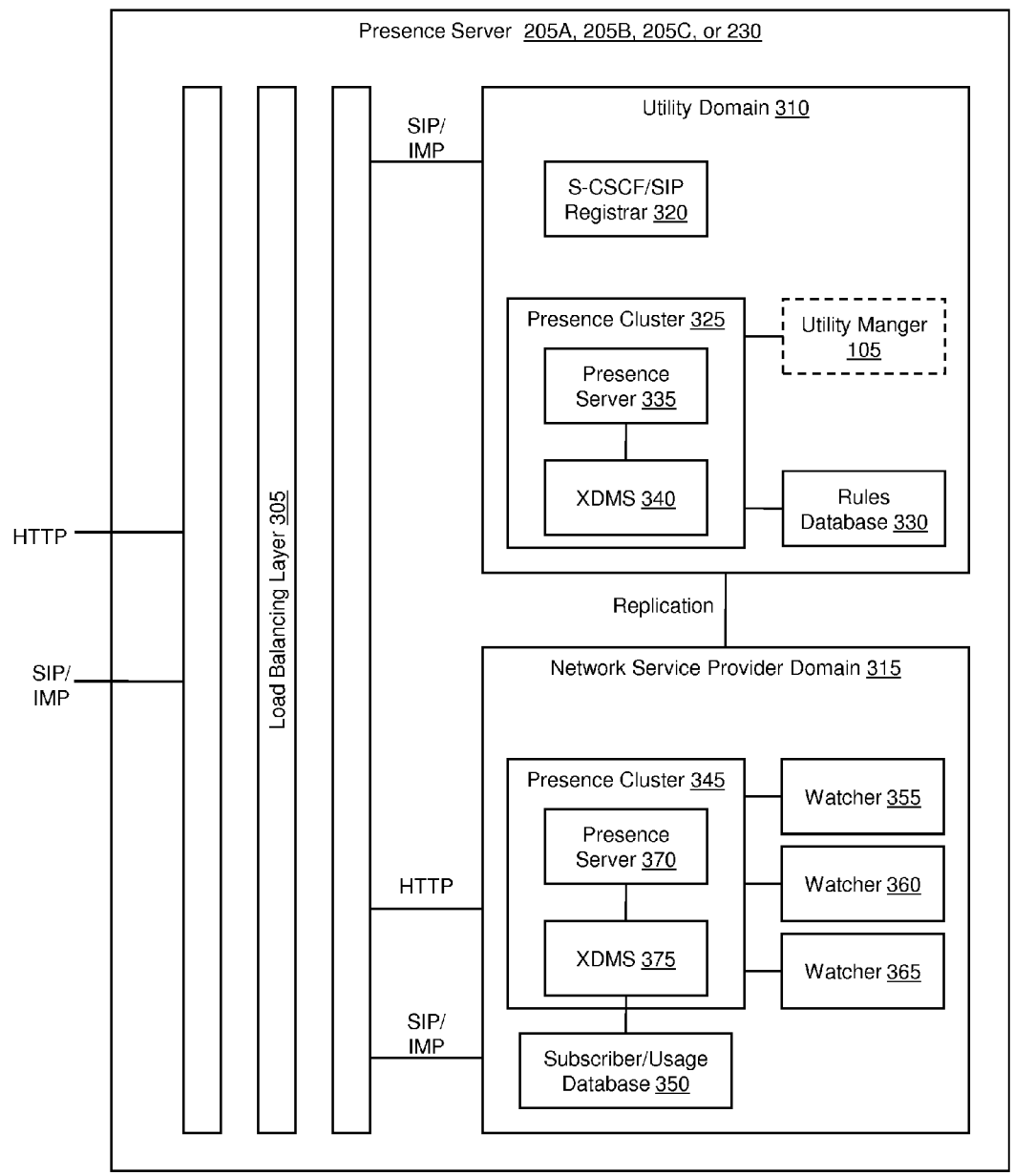
FIG. 3 shows an illustrative environment of a presence server for implementing steps in accordance with aspects of the invention.

FIG. 3 shows an illustrative environment of the presence server 205A, 205B, 205C, or 230, for implementing steps in accordance with aspects of the invention. In embodiments, the presence server 205A, 205B, 205C, or 230 can include a load balancing layer 305, a utility domain 310, and a network service provider domain 315. Components (e.g., the electrical devices 110A-110L and the subscriber devices 115 in FIG. 2) communicate with the domains 310, 315 via the load balancing layer 305 which may distribute data (e.g., a load) evenly between the above entities. For example, the load balancing layer 305 may be provided in a network switch and a gateway router, which may be implemented in the computing device 14 of FIG. 1. The load balancing layer 305 includes a SIP or IMP client and a web client such that the load balancing layer 305 is able to communicate in SIP, IMP, and HTTP with other SIP-enabled, IMP-enabled, and/or HTTP-enabled entities.

The utility domain 310 is a network domain of a utility, an electricity supplier, and/or other service provider. In embodiments, the utility domain 310 can include a Serving Call Session Control Function (S-CSCF)/SIP registrar 320, a presence cluster 325, the utility manager 105, and a rules database 330. The S-CSCF/SIP registrar 320 is a SIP server that controls SIP sessions between components (e.g., the electrical devices 110A-110L and the subscriber devices 115 in FIG. 2) and the domains 310, 315. In particular, the S-CSCF/SIP registrar 320 handles SIP registrations of the electrical devices 110A-110L and the subscriber devices 115. So, over and above a Mobile Subscriber Integrated Services Digital Network Number (MSISDN) of these entities, they are registered as IP Multimedia Subsystem (IMS)/SIP clients in the domains 310, 315. In embodiments, the S-CSCF/SIP registrar 320 may be implemented in the server 12 and/or the computing device 14 in FIG. 1, and may be alternatively located in the network service provider domain 315 and/or a third-party location. After registration, the S-CSCF/SIP registrar 320 forwards SIP messages from the electrical devices 110A-110L and the subscriber devices 115 to components in the domains 310, 315, such as the presence cluster 325.

The presence cluster 325 includes a presence server 335 and an Extensible Markup Language (XML) Data Management Server (XDMS) 340. The presence server 335 is a SIP application server that communicates and stores presence information of client devices, such as the electrical devices 110A-110L and the subscriber devices 115, using XML Configuration Access Protocol (XCAP). The presence server 335 can be implemented in the server 12 of FIG. 1 and, for example, in the utility manager 105. Specifically, the presence server 335 receives SIP notify messages including the presence information from the client devices. In the case of the electrical grid, the presence information may include, for example, the state information of the electrical devices 110A-110L that indicates a voltage, phase, and/or current measured by the PMUs 120A-120L. The presence information may further include an indication that an electrical fault or abnormal condition has been detected at one of the electrical devices 110A-110L. Such an indication may be determined by, e.g., the utility manager 105 based on the state information of the one of the electrical devices 110A-110L.

With this received presence information, the presence server 335 sends the presence information to the XDMS 340 over, e.g., XCAP. The XDMS 340 builds or updates a presence document including the presence information, using, e.g., XCAP. In embodiments, this presence document can include the presence information of all electrical devices and subscriber devices within a particular region of the electrical grid. The presence document may include multiple nodes, or in other words, the presence document may refer to multiple regions of the electrical grid and their associated client devices. In embodiments, the presence document and the SIP messages can be in a XML format, a Rich Presence Information Data (RPID) format, and/or a Presence Information Data Format (PDIF). The XDMS 340 may be implemented in the server 12 of FIG. 1.

Additionally, the presence server 335 receives SIP or IMP subscribe messages from the client devices, for example, the subscriber devices 115 and the utility manager 105. The subscribe messages are requests to receive (e.g., to subscribe to) updates about the presence information from the presence server 335. The presence server 335 manages these subscribe messages from the client devices and when there is an update about the presence information, the presence server 335 automatically sends SIP or IMP publish messages (with the presence information) quickly and effectively to the subscribing client devices, e.g., the subscriber devices 115 and the utility manager 105. The presence server 335 may send information regarding the subscribing client devices ("subscriber presence information") to the XDMS 340, which may then update the corresponding presence document to include such subscriber presence information. As a result, the presence document may include information regarding relationships between electrical devices and subscribing client devices interested in receiving updated presence information with respect to these electrical devices. That is, the presence document can associate each of its nodes to the subscriber, enabling enhanced utility data tracking with tight association to the specific subscriber or the utility provider that may be responsible for reconfiguring one or more electrical devices.

The presence information and other pertinent information can be provided to the utility manager 105 via SIP or IMP messaging. By quickly updating the utility manager 105 with the presence information of the electrical devices 110A-110L via a SIP or IMP channel, the utility manager 105 can rapidly react to any notification in a temporally and channel-appropriate manner. For example, the utility manager 105 can react to a notification "out-of-band," e.g., dispatch a field crew to the electrical devices 110A-110L to manually configure the electrical devices 110A-110L if the notification indicates that the field crew can safely work with the electrical devices 110A-110L. In another example, the field crew and/or the utility manager 105 can react to a notification "in-band," e.g., remotely send a command message (e.g., a SIP or IMP message) to the electrical devices 110A-110L to turn on or off the electrical devices 110A-110L. In embodiments, the command message may include instructions for the electrical devices 110A-110L to change its configuration in various ways, such as to be re-energized or de-energized and to increase or decrease a voltage generated by the electrical devices 110A-110L, for example, in order to isolate an electrical fault detected by the utility manager 105. In addition, the presence cluster 325 (specifically, the XDMS 340) may update the presence document pertaining to the electrical devices 110A-110L to include information regarding the command message sent to the electrical devices 110A-110L. In embodiments, the field crew and/or the utility manager 105 may send the command message through the presence server 335 (updating the pertinent presence document) to the electrical devices 110A-110L. Advantageously, the use of SIP messaging is massively scalable and results in low latency communications between the electrical devices 110A-110L, the subscriber devices 115, the presence server 335, and/or the utility manager 105.

The rules database 330 includes and stores rules set by the subscriber, the service provider, and/or the utility manager 105 regarding monitoring and control of the electrical device 110A-110L. For example, the rules can indicate that the subscriber has allowed the utility (e.g., the utility manager 105) to control the electrical devices 110A-110L. The rules may also indicate what constitutes critical events at the electrical devices 110A-110L that require control of the electrical devices 110A-110L and thus, include event lists and event categories. For example, these critical events can include the electrical devices 110A-110L (i) generating or transmitting power over or under a predetermined threshold, (ii) being on or off, (iii) indicating a blown fuse or a maintenance signal, (iv) overheating, (v) having an electrical fault, etc. The control of the electrical devices 110A-110L may be accomplished via the utility manager 105 (and/or another watcher) sending or forwarding a command message to the electrical devices 110A-110L that is determined from the rules database 330. The command message can include a command indicating to the electrical devices 110A-110L which actions to take in response to critical events at the electrical devices 110A-110L. For example, the command message may include a SIP-based fault isolation command message that instructs the electrical devices 110A-110L to execute requested configuration changes (e.g., switch on or off) aimed at isolating an electrical fault or abnormal condition. In another example, the rules may indicate to the utility manager 105 to dispatch a field crew to the electrical devices 110A-110L to isolate an electrical fault at the electrical devices 110A-110L, and/or to perform or initiate other actions to take in response to critical events. In embodiments, the rules database 330 may be set by a subscriber, a service provider, etc., via the subscriber devices 115.

The network service provider domain 315 is a network domain of an Internet service provider and/or a cellular service provider. In embodiments, the network service provider domain 315 can include a presence cluster 345, a subscriber/usage database 350, and watchers 355, 360, and 365. The presence cluster 345 includes a presence server 370 and a XDMS 375, which perform functions similar to those of the presence server 335 and the XDMS 340 in the utility domain 310. In fact, all information (e.g., the presence information and the subscriber presence information) received and processed in the presence server 335 and the XDMS 340 in the utility domain 310 may be transferred to, or replicated in, the presence server 370 and the XDMS 375 in the network service provider domain 315, and vice versa. In embodiments, replication in the domains 310, 315 can be accomplished via peering and dedicated bandwidth between the domains 310, 315. In embodiments, the presence servers 335, 370 may be in a hierarchal relationship, for example, where the presence server 335 is a primary, master server and the presence server 370 is a secondary, slave server.

The subscriber/usage database 350 receives the built or replicated presence documents from the XDMS 375 and stores the presence documents for the system. The watchers 355, 360, 365 are entities in the network service provider domain 315 that send SIP or IMP subscribe messages to the presence cluster 345 to subscribe to updates regarding the presence information in the presence server 370, e.g., the SIP or IMP publish messages. For example, one of the watchers 355, 360, 365 can represent the utility (e.g., a dispatcher at a utility control center), and may be implemented in the computing device 14 in FIG. 1.

By subscribing to the SIP publish messages, the watchers 355, 360, 365 are able to watch for notifications of the critical events and the state information of the electrical devices 110A-110L. In addition, the watchers 355, 360, 365 are able to react to these notifications as necessary. For example, if the watcher 355 represents the utility and observes a notification of an electrical fault at the electrical devices 110A-110L, the watcher 355 may cut electricity to the electrical devices 110A-110L (possibly via the command message to the electrical devices 110A-110L), to prevent further electrical faults at other electrical devices.

In embodiments, presence infrastructure (e.g., the presence cluster 345) can be only present in the network service provider domain 315, and a watcher (e.g., the utility manager 105) can be present in the utility domain 310. In other words, the utility manager 105 may correspond to a watcher. In this embodiment, the utility manager 105 can subscribe to all presence information updates or events and react as necessary. To transfer information, the domains 310, 315 may include dedicated bandwidth between the two sides. In embodiments, the presence infrastructure can include multiple presence clusters for different types of devices, such as subscriber devices, electrical devices, and watchers.

In embodiments, a third-party watcher can be hosted in a third-party environment, which is completely configurable by a subscriber. Specifically, the subscriber may configure how the environment infrastructure could react to notifications of the critical events or the state information of the electrical devices 110A-110L or the subscriber devices 115, as necessary. The infrastructure may be implemented in the server 12 and/or the computing device 14 in FIG. 1.

Figure 4:
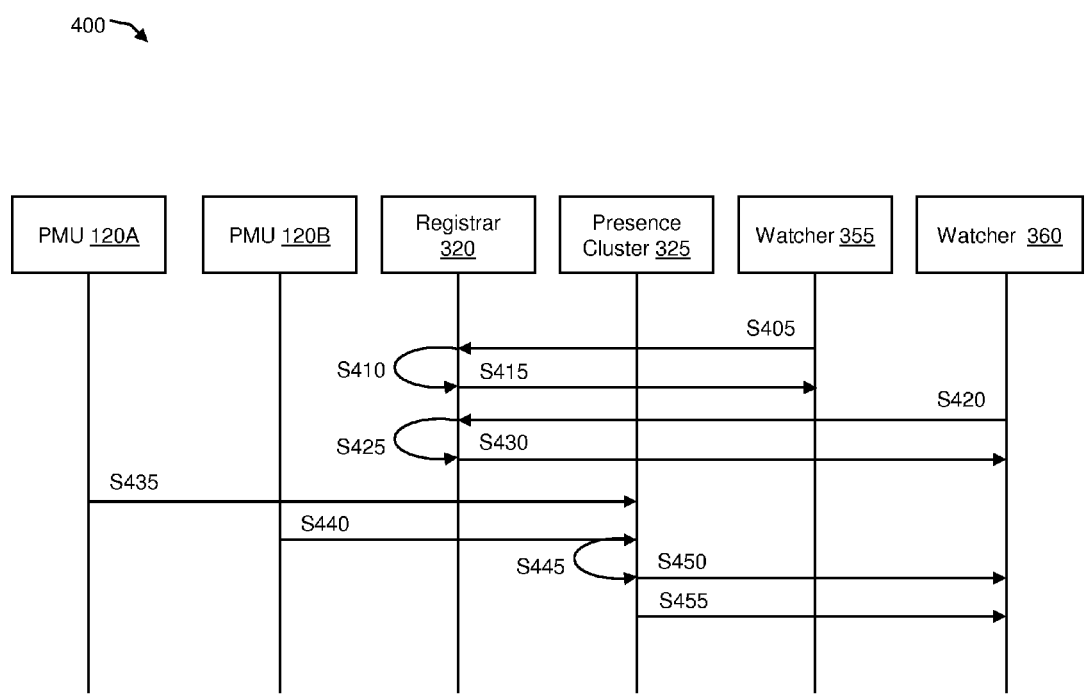
FIGS. 4-6 show exemplary flows for monitoring and optimizing a state of an electrical grid in accordance with aspects of the invention.
Figure 5:
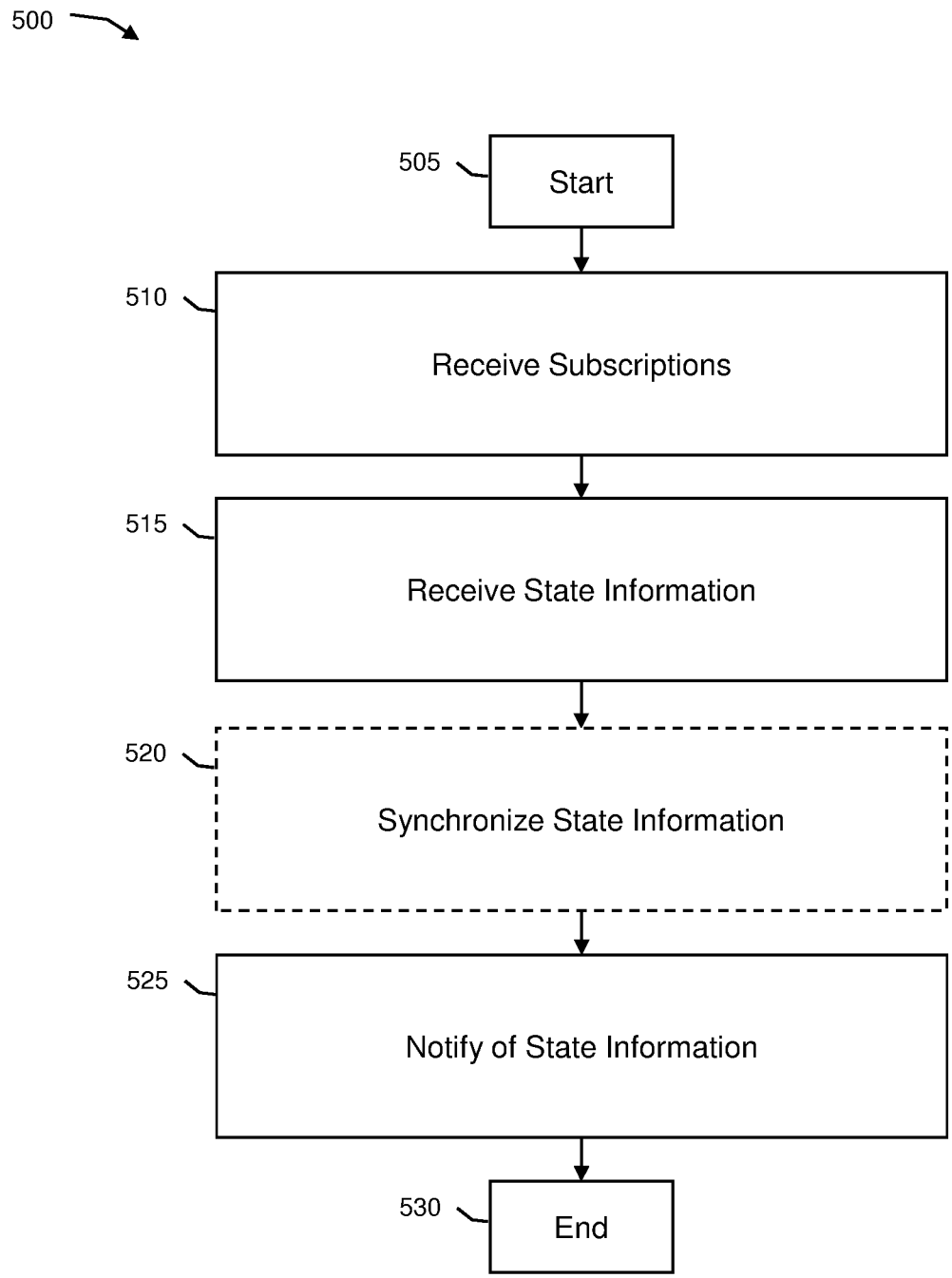
Figure 6:
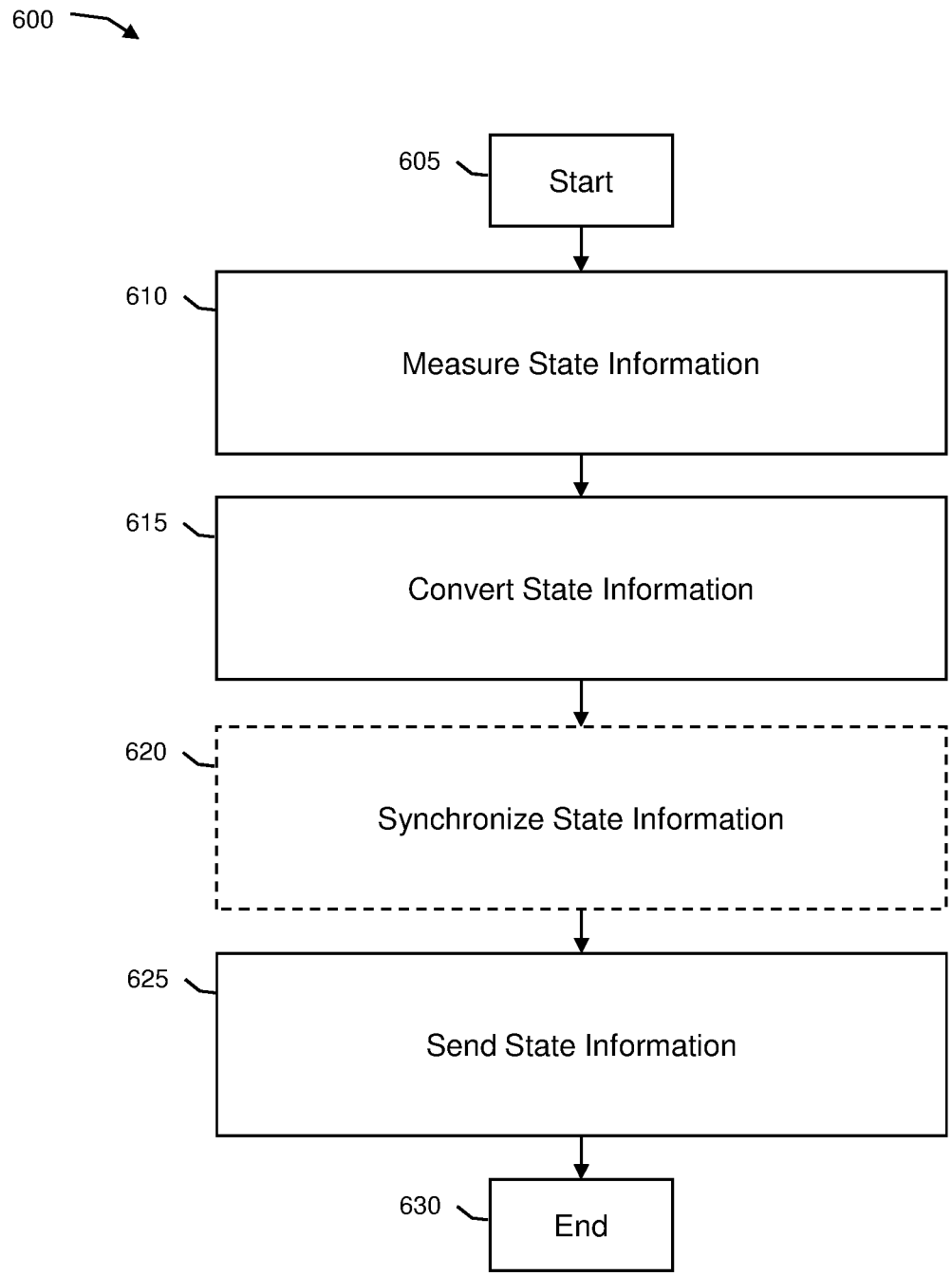

FIGS. 4-6 show exemplary flows for performing aspects of the present invention. The steps of FIGS. 4-6 may be implemented in the environments of FIGS. 1-3, for example. The flowcharts and block diagrams in the Figures illustrate the architecture, functionality, and operation of possible implementations of systems, methods and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

Furthermore, the invention can take the form of a computer program product accessible from a computer-usable or computer-readable medium providing program code for use by or in connection with a computer or any instruction execution system. The software and/or computer program product can be implemented in the environment of FIGS. 1-3. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disc-read/write (CD-R/W) and DVD.

FIG. 4 depicts an exemplary flow for a process 400 of monitoring and optimizing a state of an electrical grid in accordance with aspects of the present invention. In embodiments, the process 400 can involve six players: the Phasor Measurement Unit (PMU) 120A and the Phasor Measurement Unit (PMU) 120B, in FIG. 2; and the S-CSCF/SIP registrar 320, the presence cluster 325, the watcher 355, and the watcher 360, in FIG. 3. At step S405, the process starts, and the watcher 355 sends one or more subscriptions to the registrar 320 that indicate that the watcher 355 requests to receive state information of PMUs from the presence cluster 325 when the state information is available and/or changed. In embodiments, the subscriptions may include particular data sets (e.g., the voltage, phase, and/or current) of the state information that the watcher 355 requests to receive when available and/or changed. The subscriptions may be sent via, e.g., Session Initiation Protocol (SIP).

At step S410, the registrar 320 processes the subscriptions received from the watcher 355. In embodiments, the registrar 320 may store the received subscriptions in the presence cluster 325 via, e.g., XML Configuration Access Protocol (XCAP). At step S415, the registrar 320 sends an acknowledgement message to the watcher 355 that acknowledges receipt and processing of the subscriptions. The acknowledgement message may be sent via, e.g., the SIP.

At step S420, the watcher 360 sends one or more subscriptions to the registrar 320 that indicate that the watcher 360 requests to receive state information of the PMUs 120A, 120B from the presence cluster 325 when the state information is available and/or changed. In embodiments, the subscriptions may include particular data sets (e.g., the voltage, phase, and/or current) of the state information that the watcher 360 requests to receive when available and/or changed. The subscriptions may be sent via, e.g., the SIP.

At step S425, the registrar 320 processes the subscriptions received from the watcher 360. In embodiments, the registrar 320 may store the received subscriptions in the presence cluster 325 via, e.g., the XCAP. At step S430, the registrar 320 sends an acknowledgement message to the watcher 360 that acknowledges receipt and processing of the subscriptions. The acknowledgement message may be sent via, e.g., the SIP.

At step S435, the PMU 120A measures the state information of an electrical device (e.g., one of the electrical devices 110 in FIG. 1), and sends the measured state information to the presence cluster 325 via, e.g., the SIP. The state information may include, for example, a voltage, a phase, and/or a current, of the electrical device. The state information may initially be in electrical wave forms, and the PMU 120A may convert these electrical wave forms into digital signals, using digital signal processing techniques generated at a predetermined sampling rate, with a Global Position System (GPS) synchronized time. The PMU 120A may further synchronize the state information with time information from, e.g., the GPS, Network Time Protocol (NTP), and/or radio frequency (RF) synchronization, before sending the state information to presence cluster 325. The synchronizing may include adding the time information as a timestamp to the state information.

At step S440, the PMU 120B measures the state information of an electrical device (e.g., one of the electrical devices 110), and sends the measured state information to the presence cluster 325 via, e.g., the SIP. The state information may include, for example, a voltage, a phase, and/or a current, of the electrical device. The state information may initially be in electrical wave forms, and the PMU 120B may convert these electrical wave forms into digital signals, using digital signal processing techniques generated at a predetermined sampling rate with a GPS synchronized time. The PMU 120B may further synchronize the state information with time information from, e.g., the GPS, the NTP, and/or the RF synchronization, before sending the state information to presence cluster 325. The synchronizing may include adding the time information as a timestamp to the state information.

At step S445, the presence cluster 325 may synchronize the state information from the PMUs 120A, 120B with the time information from, e.g., the GPS, the NTP, and/or the RF synchronization. In embodiments, the synchronizing may include adding the time information as a timestamp to the state information. To synchronize the state information with a time which the state information is measured by the respective one of the PMUs 120A, 120B, the presence cluster 325 may further synchronize the state information with (e.g., add to or subtract from the state information) a drift correlation (e.g., an upper and/or lower bound of drift time). The drift correlation accounts for a delay or lag between the measuring of the state information at the PMUs 120A, 120B and the receiving of the state information at the presence cluster 325. Advantageously, the state information of the PMUs 120A, 120B may be synchronized to an atomic clock, and a utility, electricity supplier and/or service provider (via, e.g., the watchers 355, 360) may observe how the electrical grid is operating over time and may make assertions based on the observations. In addition, the utility may time correlate the state information to other state information measured by other PMUs at the same time, to observe a particular, wider region of the electrical grid.

At step S450, based on the received subscriptions, the presence cluster 325 automatically notifies the watcher 360 of the timed state information of the PMU 120A via, e.g., SIP-based messages. At step S455, based on the received subscriptions, the presence cluster 325 automatically notifies the watcher 360 of the timed state information of the PMU 120B via, e.g., SIP-based messages. Since in this case the watcher 355 does not subscribe to receive the state information of the PMUs 120A, 120B, the presence cluster 325 does not send the timed state information of the PMUs 120A, 120B to the watcher 355. In embodiments, each of the watchers 355, 360 may include a Supervisory Control and Data Acquisition (SCADA) system located in a particular region of the electrical grid and operated by, e.g., a regional utility and/or electricity supplier. Each of the watchers 355, 360 may make appropriate control decisions associated with the electrical grid based on the state information of the PMUs 120A, 120B, if received. For example, each of the watchers 355, 360 may send a SIP-based command message to the electrical devices associated with the PMUs 120A, 120B to reconfigure the electrical devices, e.g., to isolate the electrical devices from an electrical fault detected at the electrical devices. At step S455, the process ends.

FIG. 5 depicts another exemplary flow for a process 500 of monitoring and optimizing a state of an electrical grid in accordance with aspects of the present invention. In embodiments, the process 500 can be performed by the utility manager 105 in FIGS. 1-2. At step 505, the process starts. At step 510, the utility manager receives one or more subscriptions from one or more watchers (e.g., the central watchers 235A, 235B, 235C, 235D in FIG. 2) that indicate that the watchers request to receive state information of PMUs (e.g., the PMUs 120 in FIG. 1) from the utility manager when the state information is available and/or changed. In embodiments, the subscriptions may include particular data sets (e.g., the voltage, phase, and/or current) of the state information that the watchers request to receive when available and/or changed. The subscriptions may be sent via, e.g., Session Initiation Protocol (SIP).

At step 515, the utility manager receives the state information of an electrical device (e.g., one of the electrical devices 110 in FIG. 1) from one of the PMUs via, e.g., the SIP. The state information may include, for example, a voltage, a phase, and/or a current, of the electrical device. In embodiments, at step 520, the utility manager may synchronize the state information from the PMUs with the time information from, e.g., the GPS, the NTP, and/or the RF synchronization. The synchronizing may include adding the time information as a timestamp to the state information. In embodiments, to synchronize the state information with a time which the state information is measured by the respective one of the PMUs, the utility manager may further synchronize the state information with (e.g., add to and subtract from the state information) a drift correlation (e.g., an upper and/or lower bound of drift time) to account for a delay or lag between the measuring and the receiving of the state information.

At step 525, based on the received subscriptions, the utility manager automatically notifies the watchers of the timed state information of the PMUs via, e.g., SIP-based messages. In embodiments, for example, each of the watchers may include a Supervisory Control and Data Acquisition (SCADA) system located in a particular region of the electrical grid and operated by, e.g., a regional utility and/or electricity supplier. Each of the watchers may make appropriate control decisions associated with the electrical grid based on the received state information of the PMUs. For example, each of the watchers may send a SIP-based command message to the electrical devices associated with the PMUs to reconfigure the electrical devices, e.g., to isolate the electrical devices from an electrical fault detected at the electrical devices. At step 530, the process ends.

FIG. 6 depicts another exemplary flow for a process 600 of monitoring and optimizing a state of an electrical grid in accordance with aspects of the present invention. In embodiments, the process 600 can be performed by any of the PMUs 120 in FIG. 1. At step 605, the process starts. At step 610, the PMU measures state information of an electrical device (e.g., one of the electrical devices 110 in FIG. 1). The state information may include, for example, a voltage, a phase, and/or a current, of the electrical device.

At step 615, since the state information may initially be in electrical wave forms, the PMU may convert these electrical wave forms into digital signals, using digital signal processing techniques generated at a predetermined sampling rate, with a Global Position System (GPS) synchronized time. In embodiments, at step 620, the PMU may synchronize the state information with time information from, e.g., the GPS, Network Time Protocol (NTP), and/or radio frequency (RF) synchronization. The synchronizing may include adding the time information as a timestamp to the state information. At step 625, the PMU sends the state information to one or more presence servers (e.g., the presence servers 205A, 205B, 205C in FIG. 2) and/or a utility manager (e.g., the utility manager 105 in FIG. 1) via, e.g., the SIP. At step 630, the process ends.

In embodiments, a service provider, such as a Solution Integrator, could offer to perform the processes described herein. In this case, the service provider can create, maintain, deploy, support, etc., the computer infrastructure that performs the process steps of the invention for one or more customers. These customers may be, for example, any business that uses technology and provides or utilizes services. In return, the service provider can receive payment from the customer(s) under a subscription and/or fee agreement and/or the service provider can receive payment from the sale of advertising content to one or more third parties.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein. Many modifications and variations will be apparent to those of ordinary skill in the art without departing from the scope and spirit of the invention. The corresponding structures, materials, acts, and equivalents of all means or step plus function elements in the claims, if applicable, are intended to include any structure, material, or act for performing the function in combination with other claimed elements as specifically claimed. Accordingly, while the invention has been described in terms of embodiments, those of skill in the art will recognize that the invention can be practiced with modifications and in the spirit and scope of the appended claims.

What is claimed is:

1. A method, comprising:
   synchronizing, by a computer processor, state information associated with one or more electrical devices on an electrical grid with time information;
   synchronizing, by the computer processor, the state information with a drift correlation value that accounts for a delay between measuring the state information at the one or more electrical devices and receiving the state information at a utility manager; and
   notifying, by the computer processor, one or more subscribing devices of the state information synchronized with the time information and the drift correlation value such that the one or more subscribing devices monitors and controls the one or more electrical devices based on the synchronized state information.

2. The method of claim 1, wherein the state information comprises at least one phasor measurement of the one or more electrical devices.

3. The method of claim 2, wherein the at least one phasor measurement comprises at least one of a voltage, a phase, and a current of the one or more electrical devices.

4. The method of claim 1, wherein the state information is measured by and received from one or more phasor measurement units (PMUs) associated with the one or more electrical devices.

5. The method of claim 4, wherein the one or more PMUs convert the measured state information into digital signals based on a predetermined sampling rate, the digital signals comprising a Global Positioning System (GPS) synchronized time.

6. The method of claim 4, wherein the one or more PMUs synchronize the state information with the time information from at least one a Global Positioning System (GPS), a Network Time Protocol (NTP), and radio frequency (RF) synchronization.

7. The method of claim 6, wherein:
   the synchronizing with the time information comprises adding the time information as a timestamp to the state information; and
   the synchronizing with the drift correlation value comprises adjusting the time information with the drift correlation value.

8. The method of claim 1, wherein the time information is from at least one a Global Positioning System (GPS), a Network Time Protocol (NTP), and radio frequency (RF) synchronization.

9. The method of claim 1, further comprising:
   receiving one or more subscriptions from the one or more subscribing devices requesting to register the one or more subscribing devices with a Serving Call Session Control Function (S-CSCF)/Session Initiation Protocol (SIP) registrar of a presence server, wherein the one or more subscriptions are one or more SIP register messages indicating particular data sets of the state information that the one or more subscribing devices request to receive when the state information is at least one of available and changed;
   storing the one or more SIP register messages in the presence server; and
   automatically notifying, by the presence server based on the received one or more subscriptions, the one or more subscribing devices of the data sets of the state information via SIP-based messages.

10. The method of claim 1, wherein a service provider at least one of creates, maintains, deploys and supports a computer infrastructure operable to perform the steps of claim 1.

11. The method of claim 1, wherein the steps of claim 1 are provided by a service provider on a subscription, advertising, and/or fee basis.

12. A system implemented in hardware, comprising:
   one or more computer processors;
   a computer readable hardware storage device; and
   program instructions stored on the computer readable hardware storage device for execution by the one or more computer processors, the program instructions comprising:
      program instructions to receive one or more subscriptions from one or more subscribing devices that indicate that the one or more subscribing devices request to receive state information associated with one or more electrical devices on an electrical grid;
      program instructions to synchronize the state information with time information and with a drift correlation value that accounts for a delay between measuring the state information at the one or more electrical devices and receiving the state information by the system; and
      program instructions to notify the one or more subscribing devices of the state information synchronized with the time information and the drift correlation value based on the one or more subscriptions such that the one or more subscribing devices monitors and controls the one or more electrical devices based on the synchronized state information.

13. The system of claim 12, wherein the state information is measured by and received from one or more phasor measurement units (PMUs) associated with the one or more electrical devices.

14. The system of claim 13, wherein the one or more PMUs convert the measured state information into digital signals based on a predetermined sampling rate, the digital signals comprising a Global Positioning System (GPS) synchronized time.

15. The system of claim 13, wherein the one or more PMUs synchronize the state information with the time information from at least one a Global Positioning System (GPS), a Network Time Protocol (NTP), and radio frequency (RF) synchronization.

16. The system of claim 12, wherein the time information is from at least one a Global Positioning System (GPS), a Network Time Protocol (NTP), and radio frequency (RF) synchronization.

17. The system of claim 12, wherein the receiving the one or more subscriptions comprises receiving one or more SIP register messages from the one or more subscribing devices requesting to register the one or more subscribing devices with a Serving Call Session Control Function (S-CSCF)/Session Initiation Protocol (SIP) registrar of a presence server, the one or more SIP register messages indicating particular data sets of the state information that the one or more subscribing devices request to receive when the state information is at least one of available and changed.

18. A computer program product comprising a computer readable hardware storage device and program instructions stored on the computer readable hardware storage device, the program instructions comprising:
   program instructions to synchronize state information associated with one or more electrical devices on an electrical grid with time information;
   program instructions to synchronize the state information with a drift correlation value that accounts for a delay between measuring the state information at the one or more electrical devices and receiving the state information at a utility manager; and program instructions to notify a subscribing device of the state information synchronized with the time information and the drift correlation value such that the subscribing device at least one of monitors and controls the one or more electrical devices based on the synchronized state information.

19. The computer program product of claim 18, wherein the time information is from at least one a Global Positioning System (GPS), a Network Time Protocol (NTP), and radio frequency (RF) synchronization.

20. The computer program product of claim 18, further comprising:

receiving one or more subscriptions from the subscribing device requesting to register the subscribing device with a Serving Call Session Control Function (S-CSCF)/Session Initiation Protocol (SIP) registrar of a presence server, wherein the one or more subscriptions are one or more SIP register messages including particular data sets of the state information that the subscribing device requests to receive when the state information is at least one of available and changed;

storing the one or more SIP register messages in the presence server; and automatically notifying, by the presence server based on the received subscriptions, the subscribing device of the data sets of the state information via SIP-based messages.

21. A method for monitoring and optimizing an electrical grid state, comprising:

measuring, by a computer processor, state information associated with one or more electrical devices of an electrical grid; and synchronizing, by the computer processor, the state information with time information and a drift correlation value such that the synchronized state information is transmitted to a subscribing device which at least one or monitors and controls the one or more electrical devices based on the synchronized state information, wherein the drift correlation value accounts for a delay between measuring the state information at the one or more electrical devices and receiving the state information at a utility manager.

22. The method of claim 21, further comprising converting the measured state information into digital signals based on a predetermined sampling rate, the digital signals comprising a Global Position System (GPS) synchronized time.

23. The method of claim 21, further comprising:

receiving a subscription from the subscribing devices requesting to register the subscribing device with a Serving Call Session Control Function (S-CSCF)/Session Initiation Protocol (SIP) registrar of a presence server, wherein the subscription is a SIP register message indicating particular data sets of the state information that the subscribing device requests to receive when the state information is at least one of available and changed;

storing the one or more SIP register messages in the presence server; and automatically notifying, by the presence server based on the received subscriptions, the subscribing device of the data sets of the state information via SIP-based messages.

24. A computer system for monitoring and optimizing an electrical grid state, the system comprising:

one or more processors;

a computer readable hardware storage device;

program instructions stored on the computer readable hardware storage device for execution by the one or more computer processors, the program instructions comprising:

program instructions to receive one or more subscriptions from one or more subscribing devices that indicate that the one or more subscribing devices request to receive state information associated with one or more electrical devices on an electrical grid, the state information comprising at least one phasor measurement of the one or more electrical devices;

program instructions to synchronize the state information with time information from at least one of a Global Position System (GPS), a Network Time Protocol (NTP), and radio frequency (RF) synchronization;

program instructions to synchronize the state information with a drift correlation value that accounts for a delay between measuring the state information at the one or more electrical devices and receiving the state information at a presence server; and program instructions to notify the one or more subscribing devices of the state information synchronized with the time information and the drift correlation value based on the one or more subscriptions such that the one or more subscribing devices monitors and controls the one or more electrical devices based on the synchronized state information.

25. The computer system of claim 24 wherein receiving comprises receiving the one or more subscriptions from the one or more subscribing devices requesting to register the one or more subscribing devices with a Serving Call Session Control Function (S-CSCF)/Session Initiation Protocol (SIP) registrar of a presence server, wherein the one or more subscriptions are one or more SIP register messages including particular data sets of the state information that the one or more subscribing devices request to receive when the state information is at least one of available and changed.

* * * * *